United States Patent
Gupta et al.

(10) Patent No.: US 12,524,332 B2
(45) Date of Patent: Jan. 13, 2026

(54) AUTOMATED TESTING DURING ZERO DOWNTIME SYSTEM MAINTENANCE

(71) Applicant: SAP SE, Walldorf (DE)

(72) Inventors: Sagar Gupta, New Delhi (IN); Ravikanth Malipeddu, Bangalore (IN); Shuchita Gaur, Faridabad (IN); Manjunatha K, Bangalore (IN); Aparna Vohra, Bangalore (IN)

(73) Assignee: SAP SE, Walldorf (DE)

( * ) Notice: Subject to any disclaimer, the term of this patent is extended or adjusted under 35 U.S.C. 154(b) by 199 days.

(21) Appl. No.: 18/460,849

(22) Filed: Sep. 5, 2023

(65) Prior Publication Data

US 2025/0077398 A1 Mar. 6, 2025

(51) Int. Cl.
G06F 11/3668 (2025.01)
G06F 11/3698 (2025.01)

(52) U.S. Cl.
CPC ...... *G06F 11/3688* (2013.01); *G06F 11/3698* (2025.01)

(58) Field of Classification Search
CPC .................................................. G06F 11/3688
USPC .................................................. 717/124–141
See application file for complete search history.

(56) References Cited

U.S. PATENT DOCUMENTS

| | | | | |
|---|---|---|---|---|
| 6,782,421 B1 * | 8/2004 | Soles | ........... | G06F 11/3452 |
| | | | | 709/200 |
| 7,921,345 B2 * | 4/2011 | Trump | ........... | G06F 11/263 |
| | | | | 714/739 |
| 8,347,267 B2 * | 1/2013 | Givoni | ........... | G06F 11/3688 |
| | | | | 717/124 |
| 8,930,897 B2 * | 1/2015 | Nassar | ........... | G06F 11/3688 |
| | | | | 717/124 |
| 9,298,569 B1 * | 3/2016 | Crisp | ........... | G06F 11/07 |
| 9,665,473 B2 * | 5/2017 | Bs | ........... | G06F 11/3684 |
| 9,753,842 B2 * | 9/2017 | Raghavan | ........... | G06F 11/3684 |
| 10,089,661 B1 * | 10/2018 | Appalaraju | ........... | G06F 16/907 |
| 10,642,721 B2 * | 5/2020 | Kulkarni | ........... | G06N 5/02 |

(Continued)

OTHER PUBLICATIONS

Naseer et al, "Zero Downtime Release: Disruption-free Load Balancing of a Multi-Billion User Website", ACM, pp. 1-13 (Year: 2020).*

(Continued)

*Primary Examiner* — Anil Khatri
(74) *Attorney, Agent, or Firm* — Buckley, Maschoff & Talwalkar LLC

(57) ABSTRACT

According to some embodiments, systems and methods are provided including receiving a scenario including a plurality of steps; assigning each step to one of: a baseline phase, a bridge phase and a post-upgrade phase, the bridge phase including a transition from a first to a second runtime system; executing an automate for the scenario including a first pause at an end of the baseline phase and a second pause at an end of the bridge phase; initiating, during the bridge phase, the transition of the system from the first to the second runtime system in response to the first pause; resuming execution of the automate for the one or more steps assigned to the bridge phase during the transition; initiating the second pause; completing the transition to the second runtime system; and resuming execution of the automate for the post-upgrade phase. Numerous other aspects are provided.

19 Claims, 15 Drawing Sheets

(56) References Cited

U.S. PATENT DOCUMENTS

| | | | | |
|---|---|---|---|---|
| 10,810,110 | B1* | 10/2020 | Thomas | G06F 11/3688 |
| 11,436,132 | B2* | 9/2022 | Hicks | G06F 11/3684 |
| 2019/0129712 | A1* | 5/2019 | Hawrylo | G06F 8/20 |

OTHER PUBLICATIONS

Zhang et al, "BPGen: An Automated Breakpoint Generator for Debugging", ACM, pp. 1-4 (Year: 2010).*
Mandal, "Bridge: A Model for Modern Software Development Process to Cater the Present Software Crisis", ACM, pp. 1-7 (Year: 2009).*
Jong et al, "Zero-Downtime SQL Database Schema Evolution for Continuous Deployment", ACM, pp. 1-10 (Year: 2017).*
Bucur et al, "Parallel Symbolic Execution for Automated Real-World Software Testing", ACM, pp. 1-15 (Year: 2011).*
Candea et al, "Automated Software Testing as a Service", ACM, pp. 1-6 (Year: 2010).*

\* cited by examiner

| SELECT | TEST PLAN NAME | SCOPE | PROCESS TYPE | BASELINE | BRIDGE | POST | REMARKS |
|---|---|---|---|---|---|---|---|
| ○ | ZD0_2VY | 2VY | WAREHOUSE POSTING CHANGES | FAILED | | | COULD NOT PROCESS BARCODE |
| ◉ | ZD0_VJO | VJO | CUSTOMER RETURNS | SUCCESS | 1202 | | |
| ○ | ZD0_2CR | 2CR | WAREHOUSE SUPPLY... | FAILED | | | MAKE ENTRY IN MANDATORY FIELD |
| ○ | ZD0_1NX | 1NX | OMNICHANNEL CONV... | SUCCESS | SUCCESS | SUCCESS | |
| ○ | ZD0_1A3 | 1A3 | AUTOMATIC MARKET RA... | SUCCESS | FAILED | | ENTRY ALREADY EXISTS... |

EXECUTE —1115

CANCEL

| | | | |
|---|---|---|---|
| TEST YOUR PROCESSES | | | |
| TEST PLANS (7654) | TEST PROCESS DETAILS | | |
| SEARCH FOR TEST PLAN 🔍 | PROCESS STEPS (20) | | |
| POST UPGRADE TESTS \| CUSTOMER TESTS | PROCESS STEP NUMBER \| NAME | TYPE — 1412 | STATUS — 1414 \| FAILURE REASONS — 1416 |
| ZDO-2VY  25% COVERAGE  1408 SUCCESS  06/22/2023 18:52:29 | 1  POST GOODS MOVEMENT | STANDARD (UI) | ☐ |
| | 2  SALES ORDER-CREATE | STANDARD (UI) | ☐ |
| SMOKE23  100% COVERAGE  SUCCESS  06/22/2023 18:51:25 | 3  OUTBOUND DELIVERY-CREATE | STANDARD (UI) | ☐ |
| | 4  OUTBOUND DELIVERY-PICKING | STANDARD (UI) | ☐ |
| ZDO-2A3  30% COVERAGE  FAILED  06/22/2023 17:33:03 | 5  POST GOODS ISSUE | STANDARD (UI) | ◇ |
| | RE-EXECUTE  RESUME | | DOWNLOAD  PRINT |

AUTOMATED TESTING DURING ZERO DOWNTIME SYSTEM MAINTENANCE

BACKGROUND

Many organizations are increasingly dependent on software user interface (UI) applications, executed on-premise or in the cloud, that are developed to address their needs. While upgrades to the applications have traditionally been a disruptive process due to temporary system unavailability, more recently, a zero downtime maintenance has been introduced for hotfix updates/release upgrades reducing the downtime from multiple hours to effectively five minutes of system downtime.

While zero downtime maintenance is effective at addressing system unavailability, it presents a challenge of testing and verifying data continuity for organizational processes during the zero downtime maintenance activities. For example, test automation tools may test UI applications to verify functional and/or non-functional requirements via automated tests scripts that test an end-to-end (E2E) scenario. An E2E scenario may include a sequence of process steps that may be supported by tools that execute program code to perform each of the steps automatically with minimal input from a user. Conventionally, these tests are performed either prior to the upgrade or post upgrade. However, with zero downtime maintenance, a user may be in the middle of performing a process while an upgrade happens in the background. Conventional tests may not test the processes occurring during the upgrade, which may result in unknown data loss.

Systems and methods are desired to test the process steps occurring during a zero downtime maintenance procedure.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 12 is a diagram illustrating a user interface according to some embodiments.

FIG. 14 is a diagram illustrating a user interface according to some embodiments.

Figure 1:
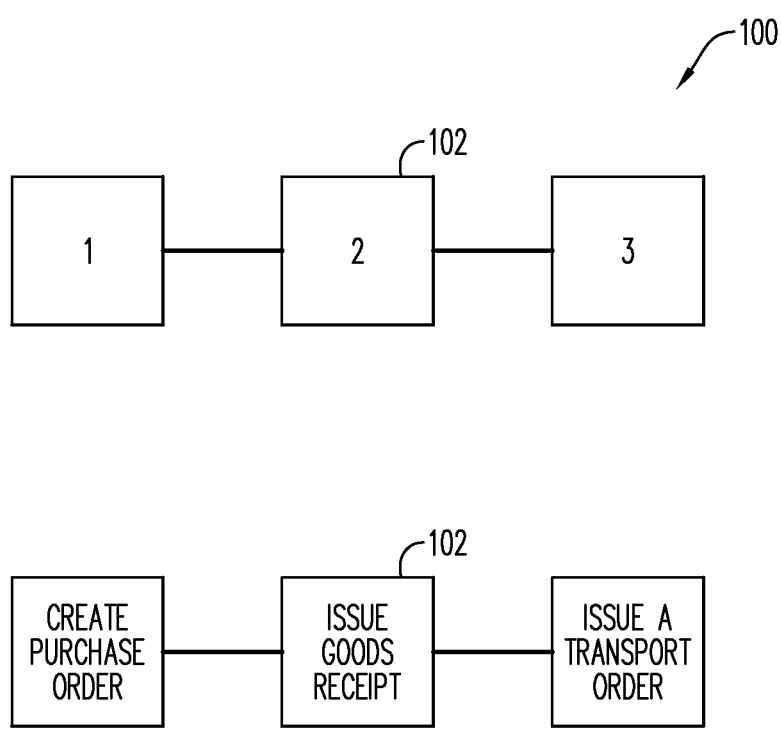
FIG. 1 is a block diagram of an E2E scenario according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, automated organizational processes are tested by an automate to ensure the data created during one process step is received by a following process step as intended to verify the process is operating as expected. The automate may simulate, or mimic, interactions between a user and web objects in the application, as well as between different steps. As used herein, the terms "automated test script," "automate", "test" "test script" and "automation" may be used interchangeably. In a case an application or other computerized element experiences a hotfix update (e.g., a code that fixes a bug) or an upgrade, the organizational process may be tested to ensure it is operating as expected with the hotfix update and/or upgrade. Prior to zero downtime maintenance, the test may be executed prior to the hotfix update/upgrade and/or after the hotfix update/upgrade. Conventional maintenance periods may be multiple hours, and during the maintenance time, users are unable to operate the system and automates are not executed since the automates mimic the user interactions. With zero downtime maintenance, which practically includes about five minutes of system downtime, overall the user does not have to stop operating the system during the downtime. For example, if the user is in the middle of executing a step, he can continue executing that step even if a hotfix update/upgrade is occurring. However, there is a chance with zero downtime maintenance that data loss occurs when the switch is happening from the older version to the newer version and conventional automates are unable to be account for this potential data loss during the time of the switch from the old version to the new version.

Pursuant to some embodiments, a maintenance test module is provided to test the functionality of the process during the switch from the old version to the new version due to a hotfix update/upgrade. The maintenance test module may separate the steps of the process into three phases—a baseline phase, a bridge phase and a post-upgrade phase. As used herein, the term "upgrade" may refer to both hotfix updates to apply a computer code that fixes a bug/problem with the existing code and an upgrade that provides enhancements and/or a whole new version of the application. After the separation, the maintenance test module executes the automate for the steps in the baseline phase prior to the transition from the old version to the new version. After the automate is completed for the steps in the baseline phase, the bridge phase begins. During the bridge phase the automate is paused and the transition of the old version to the new version is initiated. Following the transitional initiation, and while the transition is occurring, the automate is resumed for the process steps included in the bridge phase. As such, the automate for the process steps included in the bridge phase is executing while the old version is transitioning to the new version. After the automate for the process steps included in the bridge phase completes, the automate is again paused and there is confirmation that the old version has transitioned to the new version. After this confirmation, the post-upgrade phase begins and execution of the automate for the steps in the post-upgrade resumes. Embodiments ensure that in a case a user is executing a process and the system undergoes an upgrade during that time, the user does not face any challenges with regard to completing their process. Embodiments provide for the ability to create user-defined breakpoints (pauses) to achieve the functional testing of the process in an automated way, without the use of manual intervention to stop the automate during tests. Additionally, embodiments provide for the resumption of a failed execution of the automate from the beginning of the phase in which it failed instead of re-triggering the automate from the beginning of a first step of the automate.

FIG. 1 shows an end-to-end (E2E) scenario 100 according to some embodiments. In particular, an organization may have one or more particular tasks 102 (e.g., 1-3) ("process steps") that may be executed to complete a process. Together the sequence of tasks 102 may be part of the E2E scenario 100 such that the E2E scenario 100 comprises and is defined by a series of steps/tasks 102 that are completed to obtain/complete an objective. As a non-exhaustive example, consider the organization as a shoe manufacturer that would like to purchase raw material for manufacturing the shoes. The organization may secure a provider to provide 500 kgs of natural rubber for manufacturing the shoes. The E2E scenario 100 in this case may be manufacturing the shoes. The tasks may include creating a purchase order for the natural rubber (Task 1) and issuing a goods receipt once the raw materials (500 kg of naturalized rubber) are received (Task 2). The goods receipt may be transmitted to the provider, and there may be confirmation at both the organization and provider that the requested items were delivered. After the shoes are manufactured, they may be transported to a warehouse and/or stores and a transport order is created (Task 3) against the manufactured batch of shoes. This process is an E2E scenario. For each of these tasks, transactional data may be created.

Figure 2:
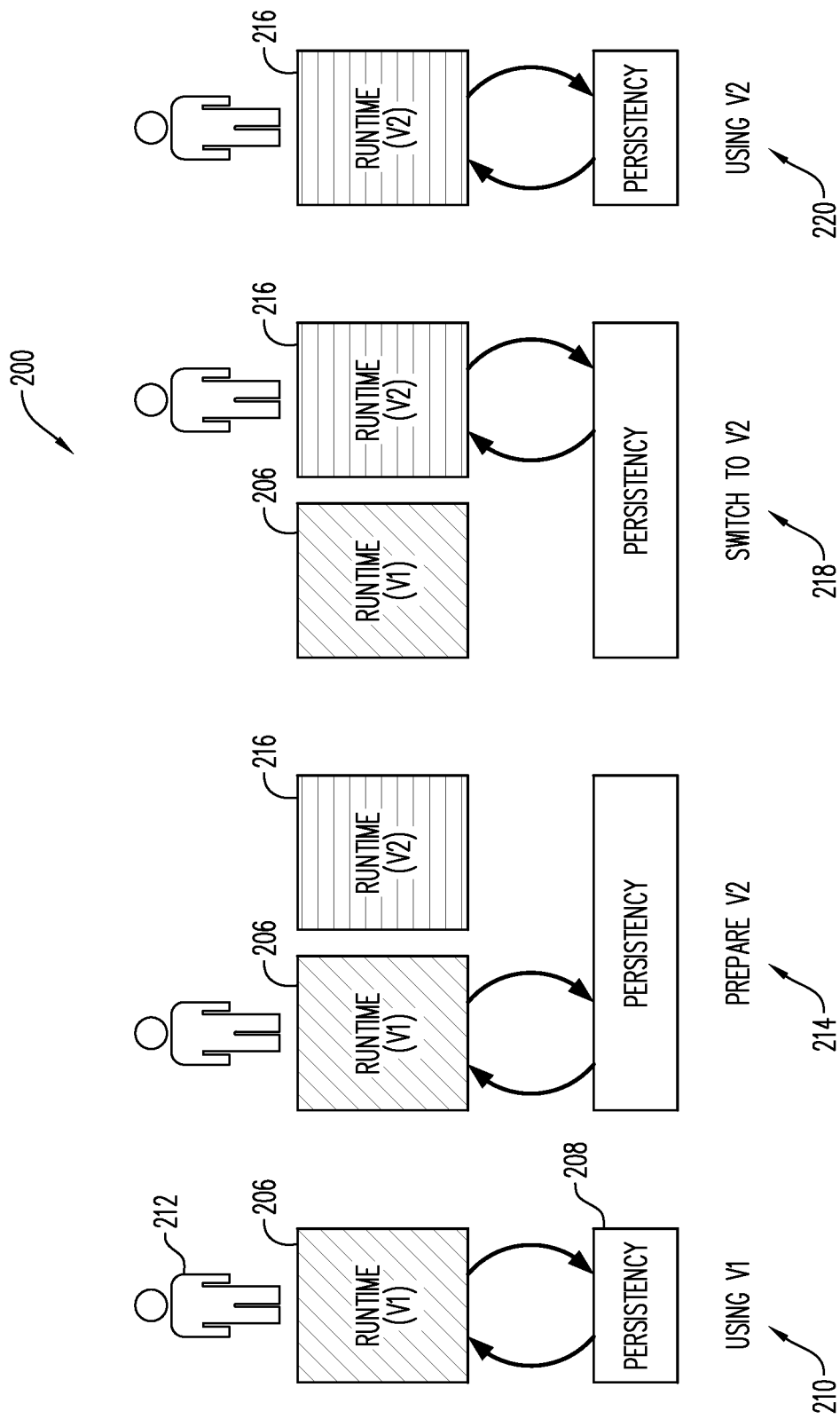
FIG. 2 is a block diagram of a zero downtime maintenance procedure according to some embodiments.

FIG. 2 is a block diagram of the zero downtime maintenance transition 200. The challenge addressed by the zero downtime maintenance transition 200 is that the upgrade and end users of an application operate on the same system at the same time, but entries from the upgrade on the database must not be overwritten again by end users and it is undesirable from a resource perspective to duplicate the full database to separate end user activities from upgrade activities. The zero downtime maintenance transition 200 includes a Version 1 (V1) runtime system 206 with its own V1 runtime and persistency layer 208 at a first phase 210. During the first runtime phase 210 the end user 212 uses the V1 runtime system 206 to access the persistency layer 208. During a second runtime phase 214, a Version 2 (V2) runtime system 216 with its own V2 runtime is prepared. The V2 runtime system 216, with a target release codebase (upgrades), is deployed in parallel to the executing V1 runtime system 206. Also, during the second runtime phase 214, customizing and data manipulation locks are implemented in the V1 runtime system 206 to maintain sanity of data between the V1 runtime system 206 and the V2 runtime system 216. For example, the locks may prevent a user from creating data that cannot be copied to the V2 runtime system 216. In some instances, the data that cannot be transferred may be a customizing change on the part of the user or a configuration that may affect the complete system. In the case of a lock, a user may receive an error message indicating the data cannot be created at this time and to create the data again in a short span of time (e.g., 5 or 10 minutes), after the transition has occurred. As part of the preparation, activation content is copied from a V1 runtime system database to a V2 runtime system database; data is migrated from the V1 runtime system 206 to the V2 runtime system 216 in the cloned tables and technical and organizational configurations which the end user may have implemented for their own processes are adjusted in the V2 runtime system 216 based on configurations previously maintained in the V1 runtime system 206. After the preparation is complete, the users are switched automatically to the V2 runtime system 216 in a third phase 218. From the end user 212 viewpoint, they do not see the switch happening, and in effect there is a zero downtime upgrade where the end user 212 does not face any downtime with their productive processes. In a fourth phase 220 the V1 runtime system 202 is removed and only the V2 runtime system 216 is used.

Figure 3:
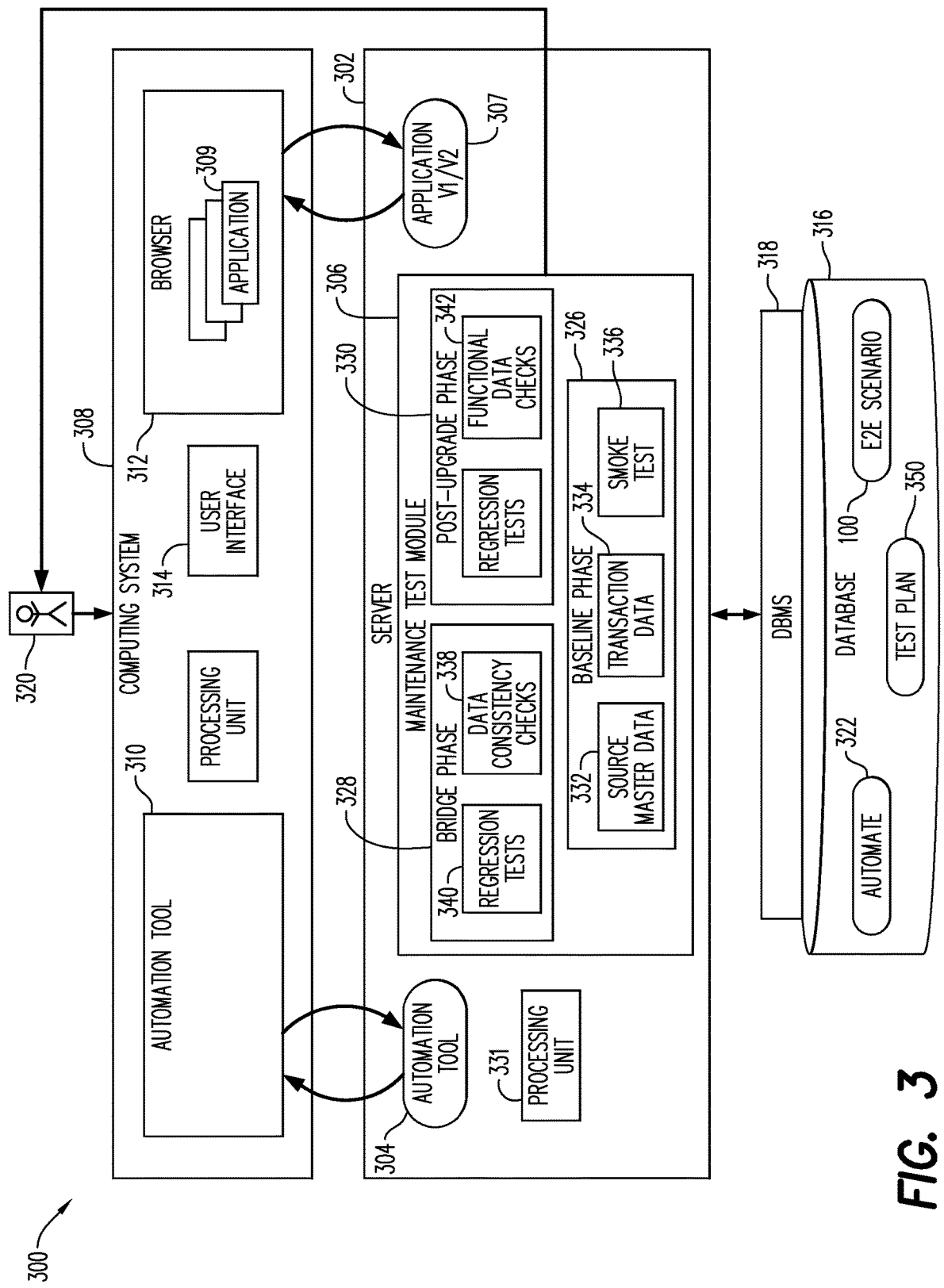
FIG. 3 is a block diagram of an architecture according to some embodiments.

FIG. 3 is a block diagram of an architecture 300 according to some embodiments. The illustrated elements of architecture 300 and of all other architectures depicted herein may be implemented using any suitable combination of computing hardware and/or software that is or becomes known.

Such combinations may include one or more programmable processors (microprocessors, central processing units, microprocessor cores, execution threads), one or more non-transitory electronic storage media, and processor-executable program code. In some embodiments, two or more elements of architecture 300 are implemented by a single computing device, and/or two or more elements of architecture 300 are co-located. One or more elements of architecture 300 may be implemented using cloud-based resources, and/or other systems which apportion computing resources elastically according to demand, need, price, and/or any other metric.

Architecture 300 includes a backend server 302 including a remote cloud-based automation tool 304 and a remote cloud-based application 307, a maintenance test module 306, a local computing system 308 including a corresponding automation tool 310, browser 312 and user interface 314, a database 316, a database management system (DBMS) 318, and a client/user 320. As used herein, the terms "client", "user" and "end-user" may be used interchangeably.

The backend server 302 may include applications 307. Applications 307 may comprise server-side executable program code (e.g., compiled code, scripts, etc.) executing within the backend server 302 to receive queries/requests from clients 320, via the local computing system 308, and provide results to clients 320 based on the data of database 316, and the output of the maintenance test module 306. The applications 307 may include both the initial V1 runtime system and the upgraded V2 runtime system.

The server 302 may provide any suitable interfaces through which users 320 may communicate with the maintenance test module 306 or applications 307/309 executing thereon. The server 302 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

Local computing system 308 may comprise a computing system operated by local user 320. Local computing system 308 may comprise a laptop computer, a desktop computer, or a tablet computer, but embodiments are not limited thereto. Local computing system 308 may consist of any combination of computing hardware and software suitable to allow system 308 to execute program code to cause the system 308 to perform the functions described herein and to store such program code and associated data.

Generally, computing system 308 executes one or more of applications 309 to provide functionality to user 320. Applications 309 may comprise any software applications that are or become known, including but not limited to data analytics applications. As will be described below, applications 309 may comprise web applications which execute within a web browser 312 of system 308 and interact with corresponding remote cloud-based applications 307 to provide desired functionality. User 320 may instruct system 308, as is known, to execute one or more of applications 307/309 under test and an associated automate 322 for the application under test and the automate 322 is executed as described by one or more embodiments during the transition of the application from the old version to the new version. The user 320 may interact with resulting displayed user interfaces 314 output from the execution of applications, to analyze the upgrade is executed correctly from a functional perspective and the data is correctly transferred into the new/changed data model.

A test automation tool 304/310 may access data in the database 316 and retrieve the data so that it is provided at runtime. While discussed further below, the database 316 may store data representing the automates 322 and other suitable data. The automates 322 may test the functionality of the E2E scenario 100 under test. Execution of the automate 322 may include performance, by an Application Programming Interface as a non-exhaustive example, of activities in a sequence designated by the automation tool including the breakpoints and resumption designated by the maintenance test module 306 using a given payload, as described further below. Database 316 represents any suitable combination of volatile (e.g., Random Access Memory) and non-volatile (e.g., fixed disk) memory used by the system to store the data.

The maintenance test module 306 may include phase-wise tests (e.g., smoke tests, regression tests, data consistency checks, etc.) to verify the functional correctness and continuity of the processes in the E2E scenario throughout the upgrade. The three phases are a baseline phase 326, a bridge phase 328 and a post-upgrade phase 330.

The first phase is the baseline phase 326, and this phase occurs prior to the transition, when the V1 runtime system is in use. During the baseline phase 326, at least one of source master data 332 may be created, transactional data 334 may be created and a smoke test 336 may be executed. Source master data 332 may be data about the entity that provides a source context for the transactional data. Transactional data 334 is information captured from transactions, including but not limited to, date and time of transaction, location of transaction, quantity, qualities of the transaction. Source master data 332 may be referred to in different transactions (e.g., entity, product, provider data). Continuing with the non-exhaustive shoe manufacturer example, the manufacturer may have several local entities (e.g., Shoe Manufacturer Germany, Shoe Manufacturer UK, etc.). The purchase order may be considered transactional data 334, and the source master data 332 may be the local company code for which the transactional purchase order was created. A smoke test 336 is used to determine if the automate is ready for the next testing phase. The smoke test 336 may determine if the basic functionalities and core features of a program work, but does not delve into finer details. As a non-exhaustive example, a smoke test may include a user opening an application, the user interface loading, the user interface including buttons that are responsive to being clicked, etc.

The second phase is the bridge phase 328 and this phase occurs during the transition from the V1 runtime system to the V2 runtime system. The tests performed during the bridge phase 328 may include data consistency checks 338 and regression tests 340 with source data. Data consistency checks 338 may include determining the transactional data being used during the process steps in the bridge phase is the same transactional data, or logically flows from the transactional data, in the baseline phase 326. Non-exhaustive examples of data consistency checks include distributed transactions or consensus algorithms. Regression tests 340 are a type of test that assesses if changes to an application (upgraded code (e.g., code changes)) will introduce defects to the existing application. Regression tests 340 may be more in-depth and detailed, as compared to smoke tests. Regression tests 340 may also use the baseline phase transaction data 334.

The third phase is the post-upgrade phase 330 and this phase occurs after the transition to the V2 runtime system and the V1 runtime system has been removed. The tests performed during the post-upgrade phase 330 may include functional data checks 342 and regression tests 340 using both baseline phase data and bridge phase data, as the data created prior to and during the transition may be used to ensure the same data is usable and not lost after the transition. The functional data checks 342 correspond to the functionality of the E2E scenario in terms of whether the process is working correctly and as expected. The functional data checks 342 may compare each function/feature of the element to an expected output to ensure the element provides the required output.

Continuing with the non-exhaustive example, after the transition has been completed, the post-upgrade phase begins and during this phase the transport order is issued. The functional data check 342 may analyze the transport order and determine whether the transport order is getting completed with data from the previous two phases. For example, the movement of the material, per the transport order, cannot be initiated without a goods receipt issue and the transport order also calls for the local company code for which the transactional purchase order was created. As such, the transport order in the post-upgrade phase uses Master data created during the baseline phase and data from the bridge phase. In a case the post-upgrade phase successfully uses the data from the baseline and/or bridge phase, the data has been maintained (not lost) during the transition.

One or more applications 307/309 executing on backend server 302 or local computing system 308 may communicate with DBMS 318 using database management interfaces such as, but not limited to, Open Database Connectivity (ODBC) and Java Database Connectivity (JDBC) interfaces. These types of applications 307/309 may use Structured Query Language (SQL) to manage and query data stored in database 316.

DBMS 318 serves requests to store, retrieve and/or modify data of database 316, and also performs administrative and management functions. Such functions may include snapshot and backup management, indexing, optimization, garbage collection, and/or any other database functions that are or become known. DBMS 318 may also provide application logic, such as database procedures and/or calculations, according to some embodiments. This application logic may comprise scripts, functional libraries and/or compiled program code. DBMS 318 may comprise any query-responsive database system that is or becomes known, including but not limited to a structured-query language (i.e., SQL) relational database management system.

Backend server 302 may provide application services (e.g., via functional libraries) which applications 307/309 may use to manage and query the data of database 316. The application services can be used to expose the database data model, with its tables, hierarchies, views and database procedures, to clients. In addition to exposing the data model, backend server 302 may host system services such as a search service.

Database 316 may store data used by at least one of: applications 307/309 and the maintenance test module 306. For example, database 316 may store the user-defined data which may be accessed by the maintenance test module 306 during execution thereof.

Database 316 may comprise any query-responsive data source or sources that are or become known, including but not limited to a structured-query language (SQL) relational database management system. Database 316 may comprise a relational database, a multi-dimensional database, an extensible Markup Language (XML) document, or any other data storage system storing structured and/or unstructured data. The data of database 316 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 302/local computing system 308.

For example, a client 320 may execute a Web Browser to request and receive a Web page (e.g., in HTML format) from a website application 307 of backend server 302 to provide the UI 314 via HTTP, HTTPS, and/or WebSocket, and may render and present the Web page according to known protocols.

Figure 4:
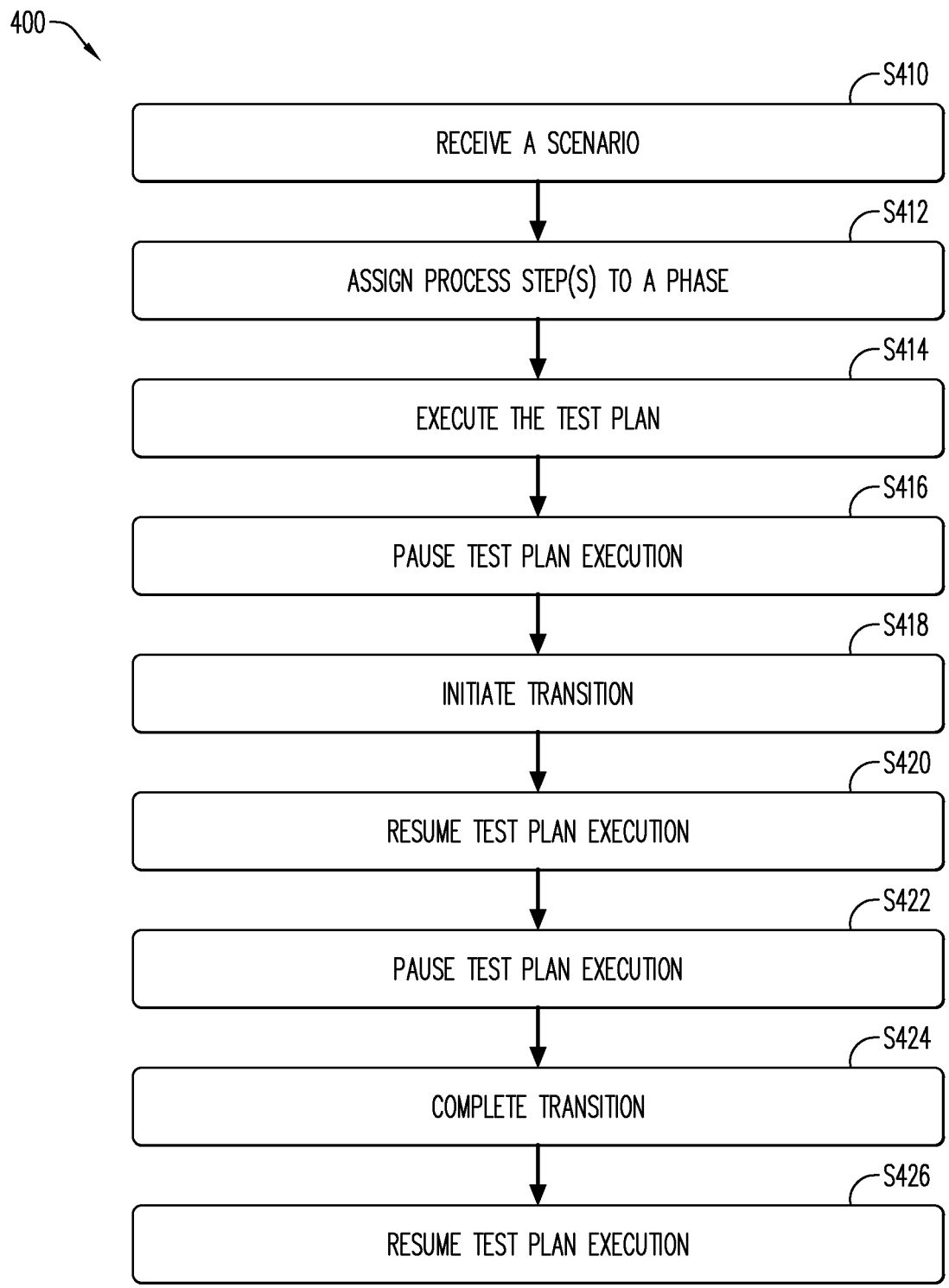
FIG. 4 is a flow diagram of a process according to some embodiments.

FIG. 4 illustrates a process 400 for executing a test plan during a transition in accordance with an example embodiment. When the transition happens and the runtime system is switched from V1 to V2, the maintenance test module 306 ensures the data created on the V1 runtime system while the switch is occurring successfully transfers to the V2 runtime system. For example, the process 400 may be performed by a database node, a cloud platform, a server, a computing system (user device), a combination of devices/nodes, or the like, according to some embodiments. In one or more embodiments, the computing system 308 or backend server 302 may be conditioned to perform the process 400 such that a processing unit 331 (FIG. 3) of the system 300 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the process 400, an E2E scenario 100 ("scenario") may be defined by an automate author. The defined scenario 100 may include one or more executable process steps 102 ("steps") to complete the scenario. Definition of the steps may be a pre-requisite to executing the automate for the E2E scenario. The automate 322 may be generated for the defined scenario 100. The automate 322 may be provided in machine-readable code. The scenario 100 and the automate 322 may be saved to a suitable data store (e.g., database 316, cloud).

Figure 5:
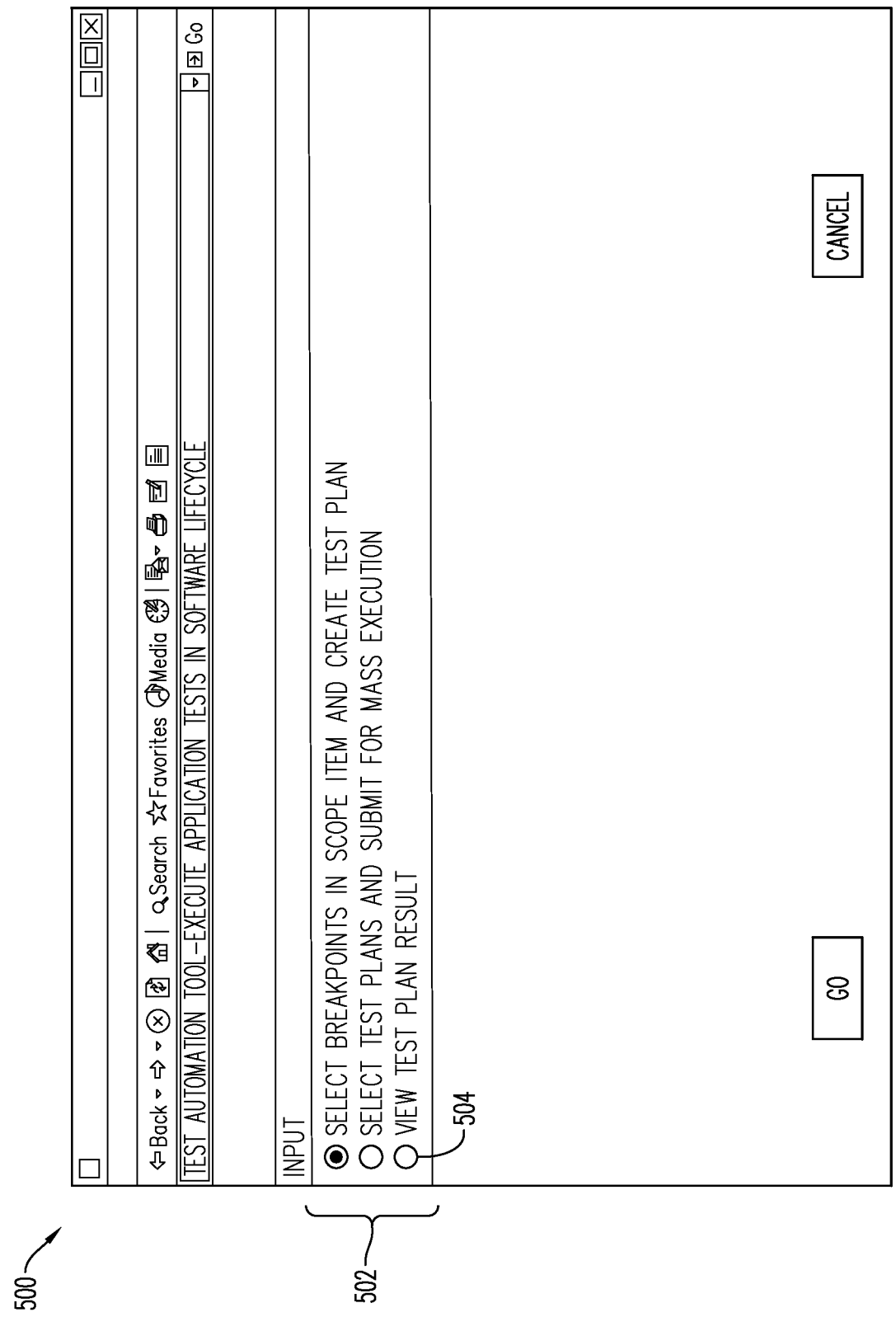
FIG. 5 is a diagram illustrating a user interface according to some embodiments.

Additionally, and also prior to the process 400, a user may access the automate tool 304/310 and be provided with a dashboard display 500 in accordance with some embodiments, as described below with respect to FIG. 5. The dashboard display 500 may display user-selectable elements 502. The user-selectable elements 502 may be for "Select Breakpoints in Scope Item and Create Test Plan", "Select Test Plan and Submit for Mass Execution" and "View Test Plan Results". Herein, the user-selectable element 502 may be selected via radio button control 504. Other suitable selection mechanisms may be used (e.g., icon, drop down menu, user entry etc.)

Figure 6:
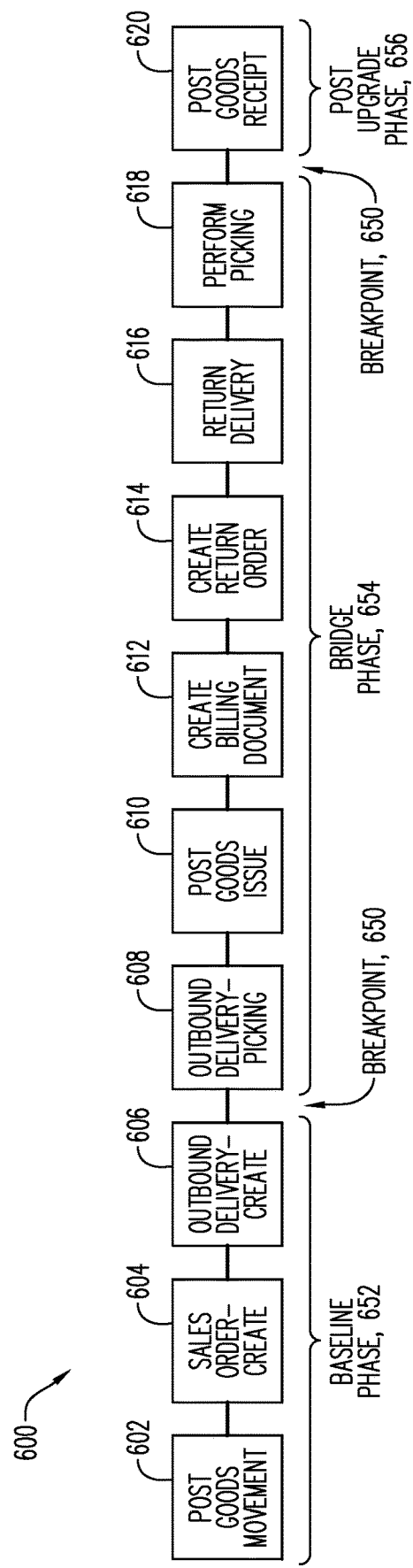
FIG. 6 is a block diagram of phases according to some embodiments.

Initially at S410, a scenario 100 is received for testing, the scenario 100 including the plurality of steps 102. Continuing with the non-exhaustive example described above, FIG. 6 shows a return process scenario 600. The scenario 600 includes ten steps—Step 1 (Post Goods Movement) 602, Step 2 (Sales Order—Create) 604, Step 3 (Outbound Delivery—Create) 606, Step 4 (Outbound Delivery-Picking) 608, Step 5 (Post Goods Issue) 610, Step 6 (Create Billing Document) 612, Step 7 (Create Return Order) 614, Step 8 (Return Delivery) 616, Step 9 (Perform Picking) 618, and Step 10 (Post Goods Receipt) 620. As another non-exhaustive example, similar to the shoe manufacturing above, in this case the return process relates to the shoes. For example, some of the shoes may be faulty or not needed, so they are returned. While the non-exhaustive scenario 600 is shown herein as having ten steps, any suitable number of steps may be included in the scenario.

Figure 7:
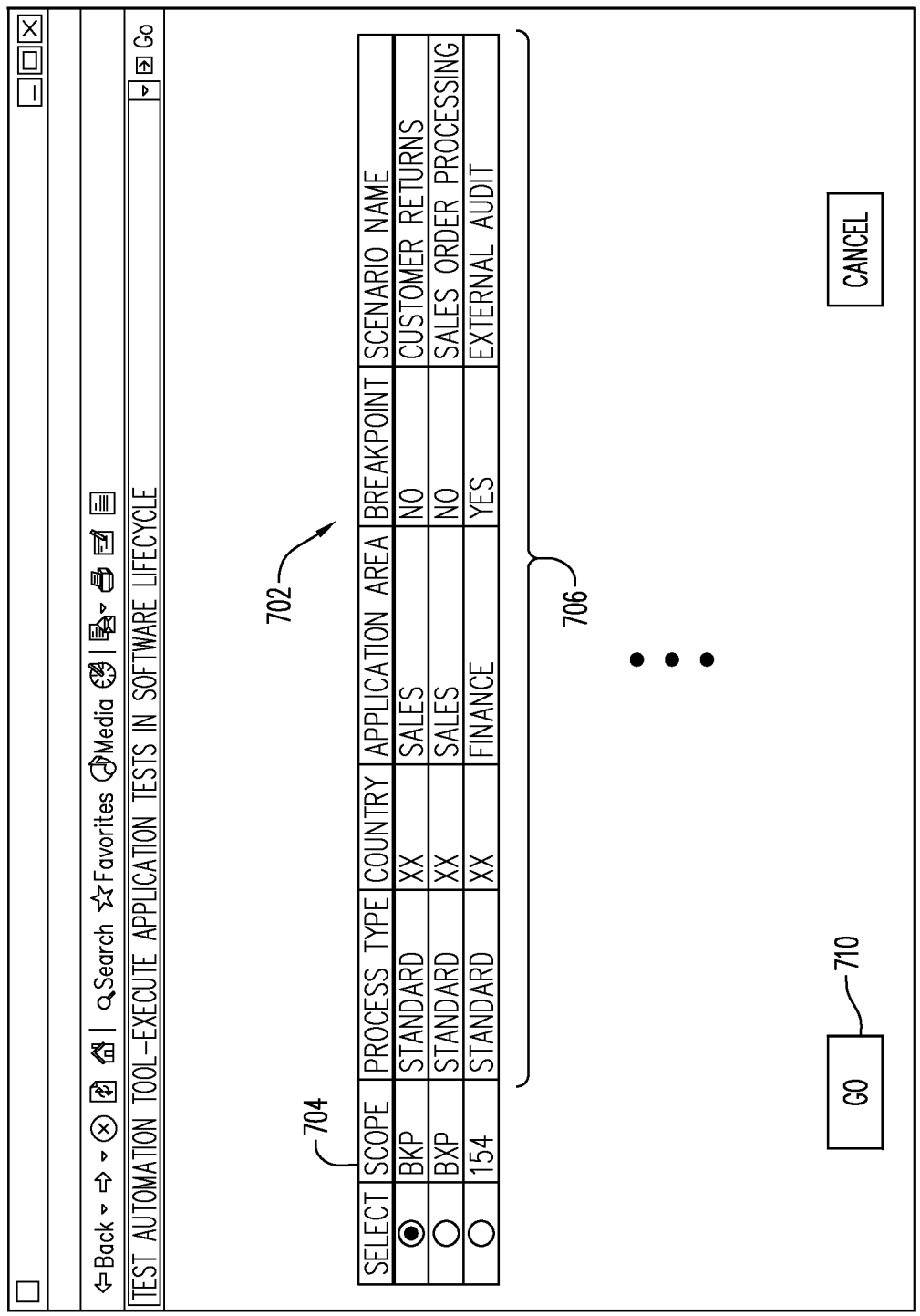
FIG. 7 is a diagram illustrating a user interface according to some embodiments.
Figure 8:
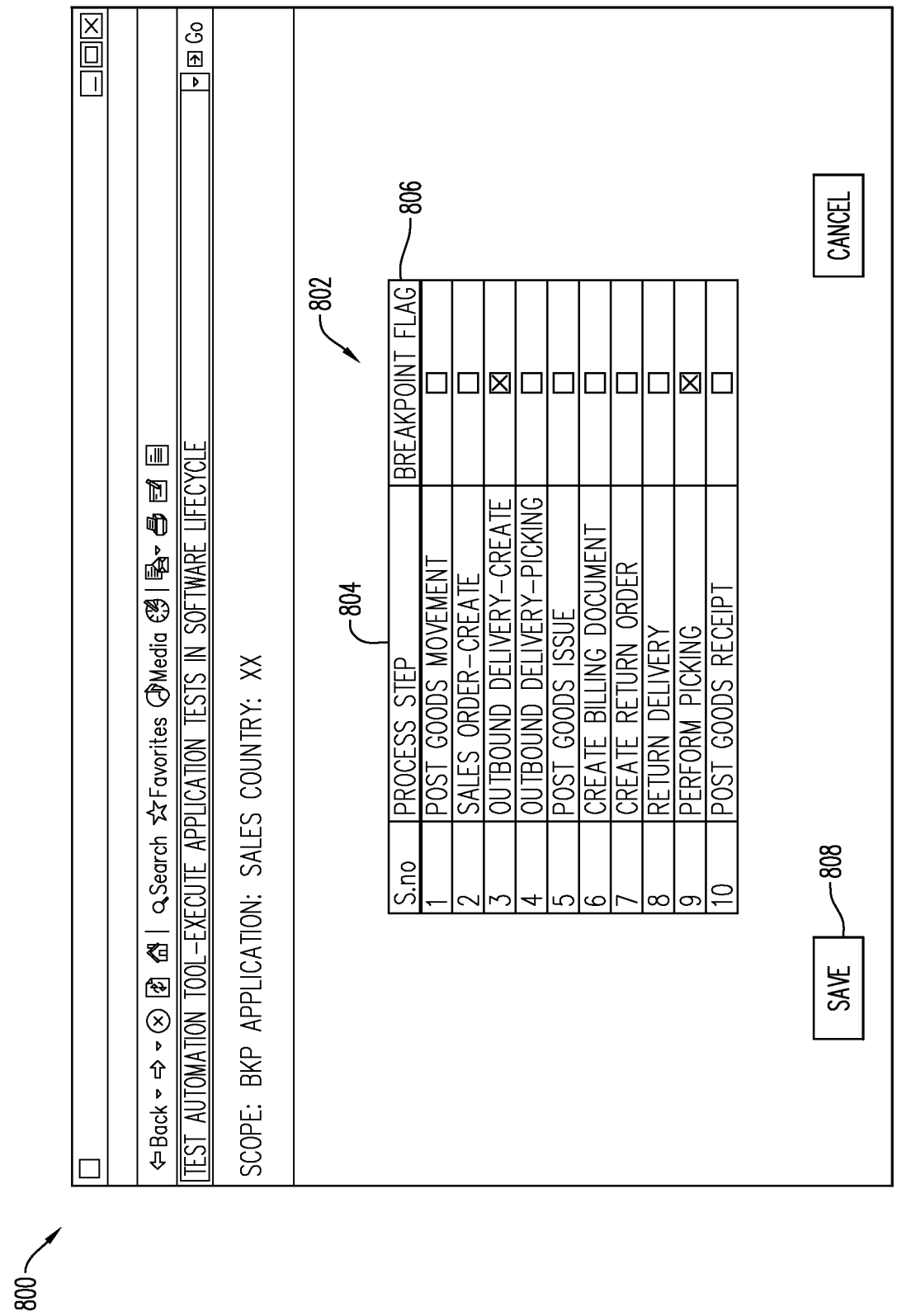
FIG. 8 is a diagram illustrating a user interface according to some embodiments.

As described above, the scenario 100/600 may be received for testing by selection via a scope selection user interface 700 (FIG. 7) of the automation tool 304/310. The user interface 700 may be rendered in response to selection of a control 504 for the "Select Breakpoints in Scope Item and Create Test Plan" element 502 on the dashboard display 500 (FIG. 5). The user interface 700 may include a table 702. The table 702 may include a plurality of selectable scenarios 704 indicated by "scope". The "scope" may indicate an identifier for a given scenario. The table may also include one or more parameters 706 and associated parameter values 708 that describe each scenario 704. The parameters 706 may include, but are not limited to, Process Type, Country, Application Area, Breakpoint and Scenario Name. The "Process Type" parameter may indicate whether the process is a standard process. The "Country" parameter may indicate the country in which the scenario is applicable. The "Application Area" parameter may refer to the type of application under test (e.g., Sales, Finance, Material Management, R&D, etc). The "Breakpoint" parameter may refer to whether breakpoints 650 (FIG. 6) have been inserted into the automate for the scenario. The breakpoints 650 may be stored in a database table (e.g., START_BREAKPOINT), which may also store each scope item with its associated phase (baseline, bridge, post-upgrade). Herein, the parameter 706 "Scenario Name" with parameter value 708 "Customer Returns" is selected, and for that scenario, no breakpoints have been inserted. The automate for a given scenario that includes breakpoints may be referred to herein as a "test plan" 350. Selecting a particular Scope and then selecting the "GO" control 710 may result in presentation of a step assignment display 800 (FIG. 8), according to some embodiments.

The step assignment display 800 may include a table 802 including the process steps 804 mapped, via a mapping engine (not shown), to the selected scope 704 and a breakpoint flag indicator 806.

In S412 each process step 804 is assigned to one of the baseline phase 652, the bridge phase 654 and the post-upgrade phase 656 and the assignment is saved. The assignment to the different phases is based on the setting of two breakpoints 650. The user 320 has the option to change the breakpoints, allowing the user to re-allocate the process steps into other phases via this step assignment user interface display 800. Herein, the breakpoint indicator has been set at Step 3 (Outbound Delivery-Create) and Step 9 (Perform Picking), assigning Steps 1-3 to the baseline phase 652. Steps 4-9 to the bridge phase 654 and Step 10 to the post-upgrade phase 656 per the scenarios of FIG. 6. Pursuant to some embodiments, when the breakpoints 650 have been set for the given process steps and saved (e.g., via selection of "Save" control 808), the automate tool 304/310 automatically creates the test plan 350 for the process, using a predetermined naming convention. In a case the test plan fails, a database table (e.g., START_LOG) will store the test plan with a failure reason. The test plan and failure reason may be displayed in a report output.

Figure 9:
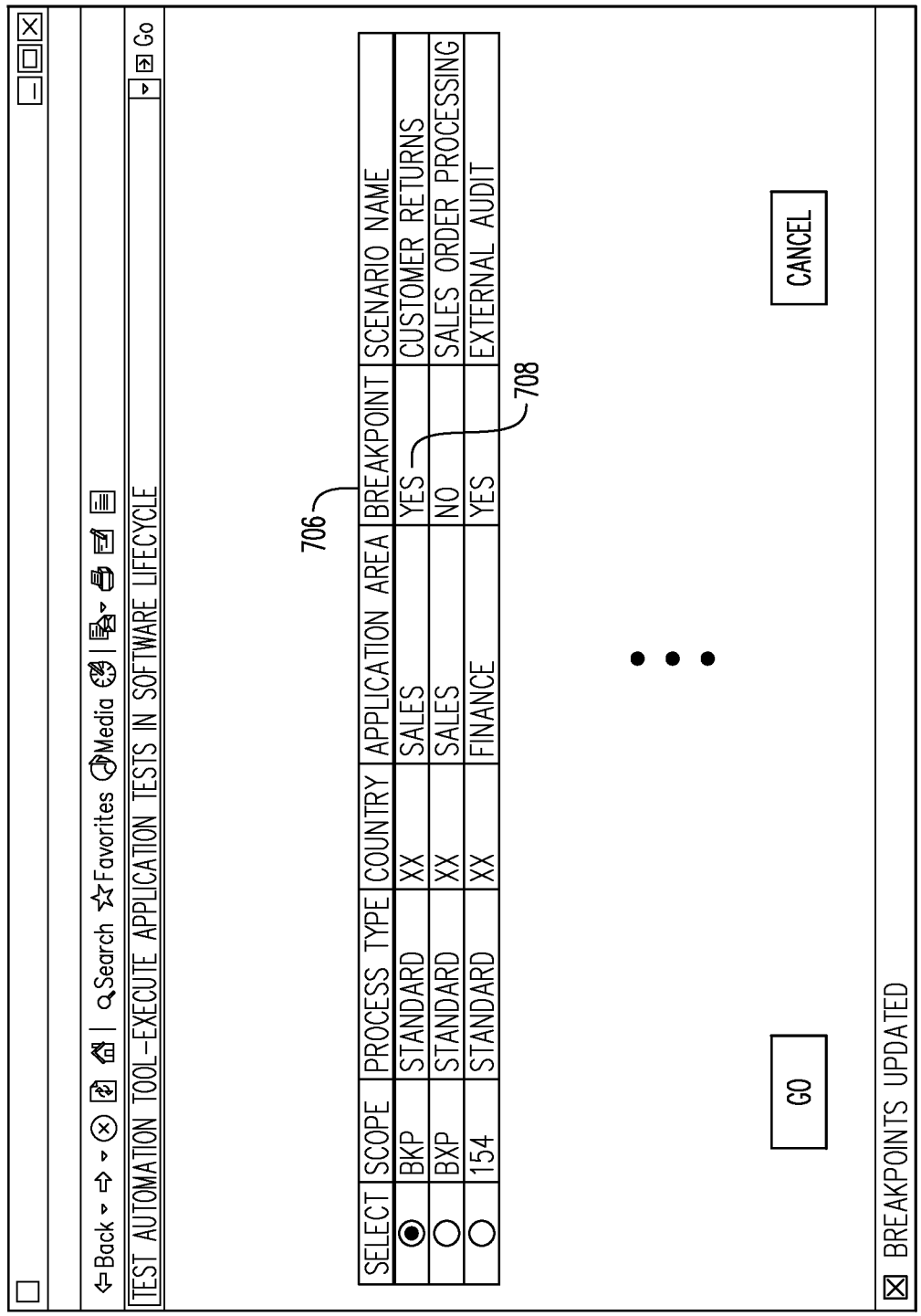
FIG. 9 is a diagram illustrating a user interface according to some embodiments.

After saving the set breakpoints 650, the scope selection user interface 700 may be updated, as shown in FIG. 9, to reflect the set breakpoints. Herein, the value 708 in the parameter 706 breakpoint column for the Customer Return is "Yes."

Then in S414, the test plan 350 (automate 322 with breakpoints 650) for the scenario is executed. As described further below, execution of the test plan includes a pause of the automate at the end of the baseline phase 652 and the end of the bridge phase 654 per the set breakpoints. It is noted that without the breakpoints, the automate would run through all of the steps sequentially, and only pause in a case one step fails. It is further noted that in conventional automate execution without breakpoints, in the case a step fails, when the automate resumes, it resumes from the first step. For example, consider the conventional automate fails at step 5, when it resumes execution, the automate would begin at step 1, not step 5. Pursuant to some embodiments, with the set breakpoints, in a case the automate fails, the automate may be resumed at the beginning of the phase in which the failure occurred. For example, if steps 3-5 are in the bridge phase, and step 4 fails, the test plan may be resumed at step 3 since step 3 is the first step of the bridge phase.

Figure 10:
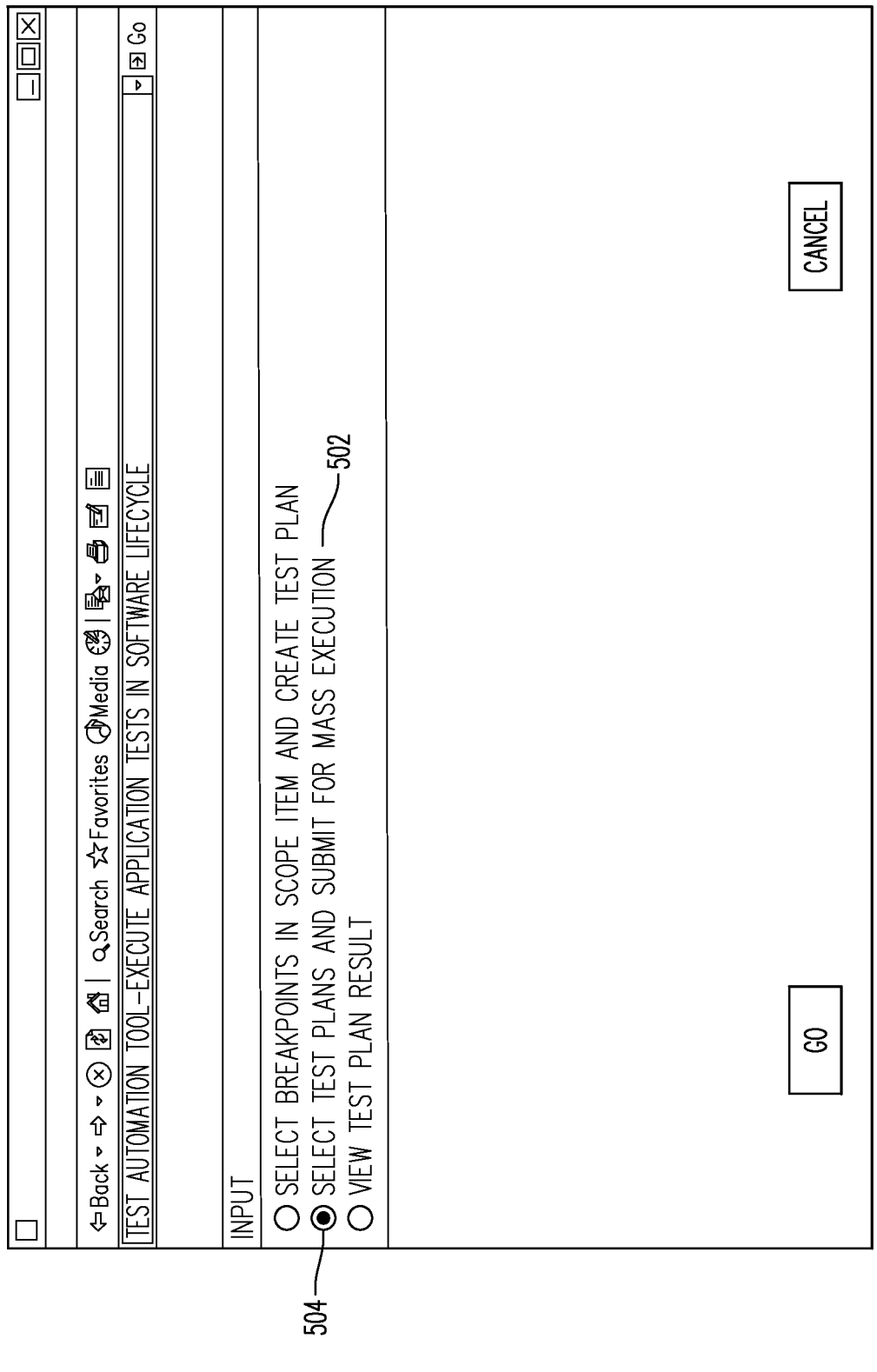
FIG. 10 is a diagram illustrating a user interface according to some embodiments.
Figure 11:
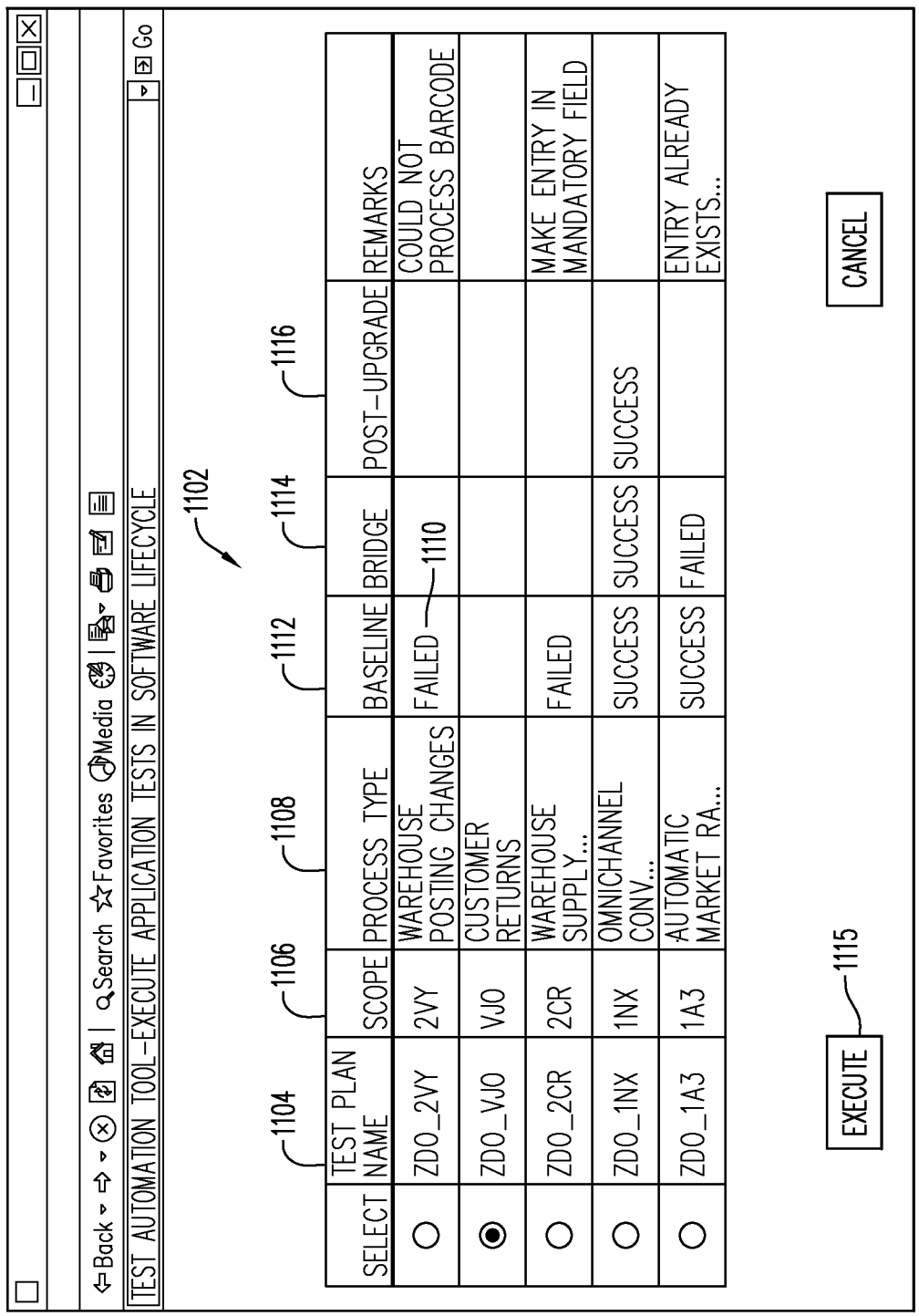
FIG. 11 is a diagram illustrating a user interface according to some embodiments.

The user 320 may first select the control 504 for the "Select Test Plans and Submit for Mass Execution" element 502 on the dashboard display 500 (FIG. 10), resulting in the presentation of the Test Plan Selection and Execution display 1100 (FIG. 11). The Test Plan Selection and Execution display 1100 (FIG. 11) includes a table 1102 with a plurality of selectable test plans 1104 for execution. Each test plan 1104 may be mapped to a particular scope 1106 and process name 1108. The table 1102 may also include a status value 1110 for each of the Baseline phase 1112, Bridge phase 1114 and Post-Upgrade phase 1116. Herein, the first test plan (ZDO_2VY) has failed the baseline phase, while the fourth test plan (ZXO-1NX) has successfully passed all of the phases. In the case of the first test plan, the user/developer may intervene and make fixes to the failed step, and then return to the same test plan and resume execution of the test plan via selection of the Execute control 1115. The resumed execution will begin at the first process step of the phase in which the failure occurred. In this example, the test plan execution will resume at the Baseline phase 1112. The Test Plan Selection and Execution display 1100 may receive selection of a test plan, and selection of the "EXECUTE" control 1115 will initiate execution of the test plan. Continuing with the non-exhaustive example, the second test plan (ZXO-VJO) for Customer Returns is selected. It is noted that there is no status value 1110 for the phases of the second test plan as it has not yet been executed.

During execution of the test plan 350, execution for all of the steps of the Baseline phase 1112 are initially executed, and for all of the process steps listed in the database table, the baseline column of the Test Plan Selection and Execution display 1100 will be updated. Continuing with the non-exhaustive example, FIG. 12 shows the updated Test Plan Selection and Execution display 1100 indicating that the Baseline phase for the Consumer Return test plan 350 has successfully completed, as indicated by the highlighted "Success" 1202 in the Baseline phase column. Once all of the process steps in the baseline phase 652 have successfully completed, the test plan pauses per the breakpoint 650 at S416. The execution of the test plan remains paused until a time when a user triggers a resumption of execution of the test plan, and the execution resumes at the next step. Pursuant to some embodiments, the resumption of the test plan may be automatically triggered without manual intervention of the user.

Next, in S418, the transition of the system from the first runtime system to the second runtime system is initiated in response to the pause/breakpoint. The transition is executed as described above with respect to FIG. 2. After the transition has been initiated and while the transition is executing, the execution of the test plan is resumed at S420 and the steps included in the bridge phase 654 are executed. During the bridge phase 654 the transition is executed up to the third phase 218 of the transition when the users are to be automatically switched to the second runtime system. After the process steps of the bridge phase 654 are successfully completed, the test plan 350 again pauses per the second breakpoint 650 at S422. The execution of the test plan 350 remains paused until a time when the user triggers the resumption of the execution of the test plan, and the execution resumes at the next step, which at this stage is the first step of the post-upgrade phase 656. During the second breakpoint/pause, the transition may be finalized and phases three 218 and four 220 of the transition may be completed at S424 so that the user is moved to the second runtime system and the first runtime system is removed. Execution of the test plan 350 may be resumed at S426 and the process steps assigned to the post-upgrade phase 656 may be executed. The process steps assigned to the post-upgrade phase 656 may be executed on the V2 runtime system 216.

Figure 13:
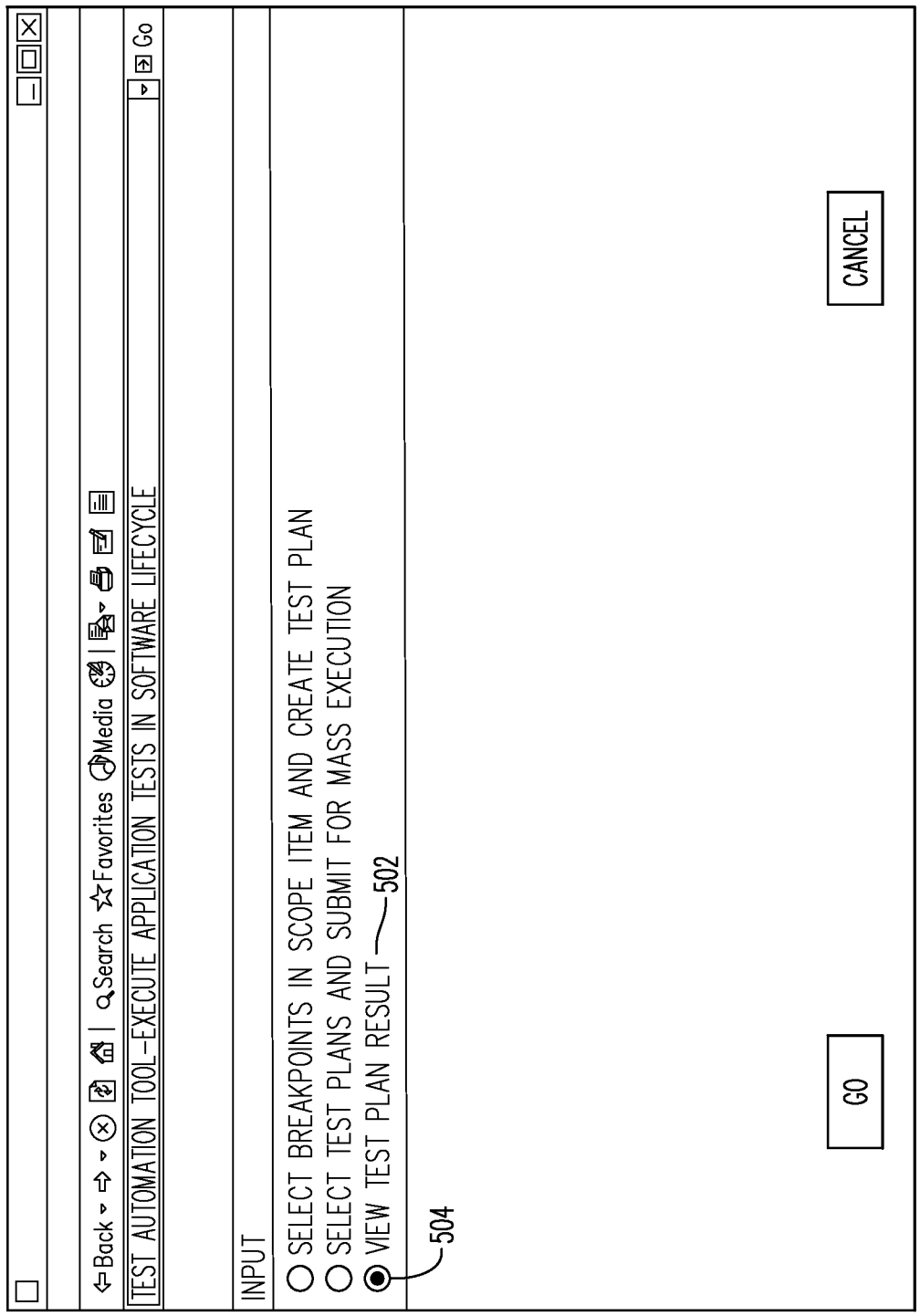
FIG. 13 is a diagram illustrating a user interface according to some embodiments.

In one or more embodiments, the user 320 may select the control for the "View Test Plan Results" element 502 on the dashboard display 500 (FIG. 13), resulting in the presentation of the Test Process Details display 1400 (FIG. 14). The Test Process Details display 1400 may display the status of the test plans at any moment (e.g., before, during and after execution). The Test Process Details display 1400 may include a first pane 1402 ("test plans") including one or more test plans 1404 and the test plan results 1408. For example, the selected first test plan (selection indicated by shading) has a 25% coverage, indicating 25% of the test plan has been completed and thus far they have been successful. The Test Process Details display also includes a second pane 1410 ("test plan details"). The second pane 1410 may include test plan results 1412 for individual process steps of the selected test plan in the first pane 1402. The test plan results 1412 for the individual process steps may include an execution status 1414 for each step of the test plan and failure reasons 1416 for failed test steps. As shown herein, regarding the execution status 1414, the "box" indicates the step was completed successfully, while the "diamond" indicates the step has not yet completed. Herein, the first five out of twenty steps have been completed successfully resulting in the 25% indicated coverage. Other suitable status indicators and combinations of indicators may be used (e.g., colors, patterns, words, etc.).

Figure 15:
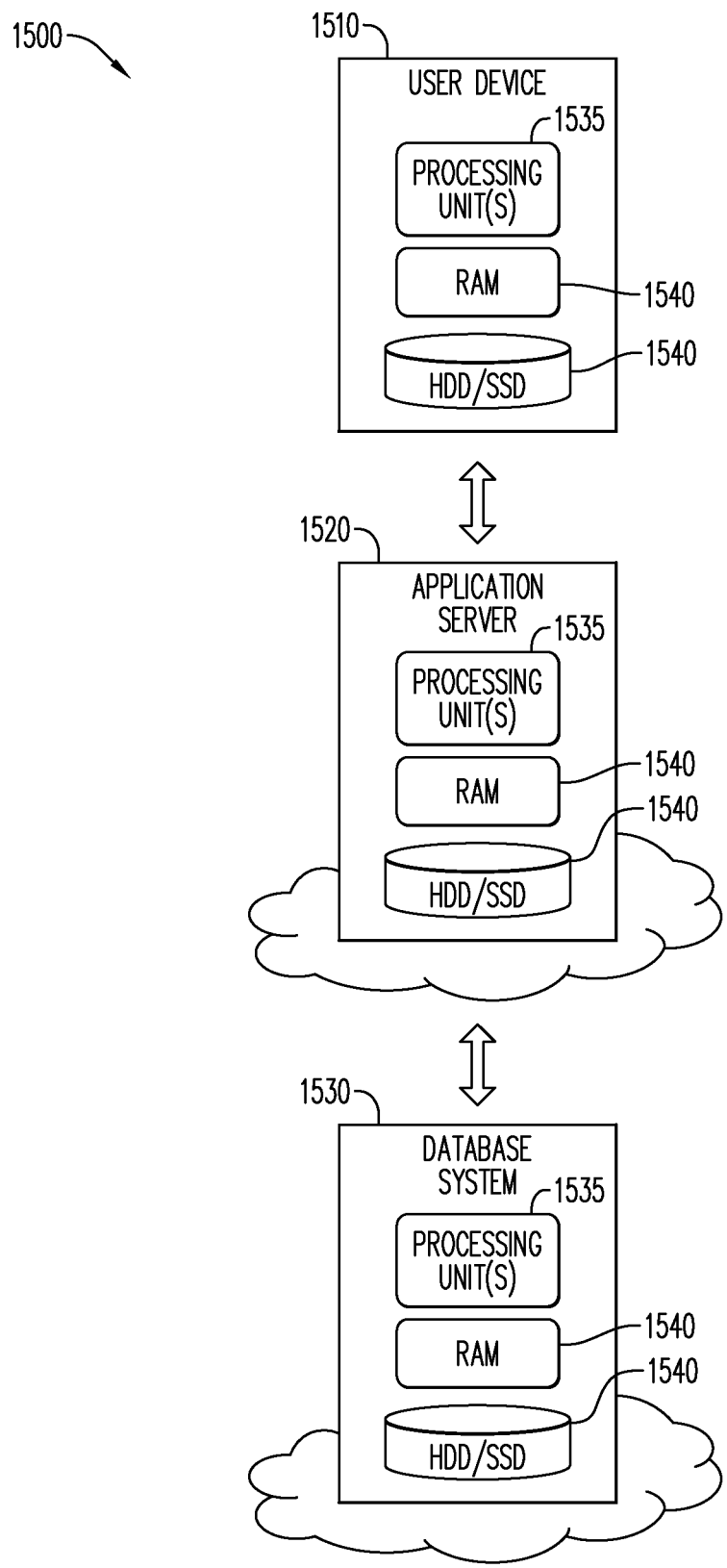
FIG. 15 is a block diagram of a cloud-based database deployment architecture according to some embodiments.

FIG. 15 illustrates a cloud-based database deployment 1500 according to some embodiments. The illustrated components may reside in one or more public clouds providing self-service and immediate provisioning, autoscaling, security, compliance and identity management features.

User device 1510 may interact with applications executing on the application server 1520 (cloud or on-premise), for example via a Web Browser executing on user device 1510, in order to create, read, update and delete data managed by database system 1530. Database system 1530 may store data as described herein and may execute processes as described herein to cause the execution of the maintenance test module 306 for use with the user device 1510. Application server 1520 and database system 1530 may comprise cloud-based compute resources, such as virtual machines, allocated by a public cloud provider. As such, application server 1520 and database system 1530 may be subjected to demand-based resource elasticity. Each of the user device 1510, application server 1520, and database system 1530 may include a processing unit 1535 that may include one or more processing devices each including one or more processing cores. In some examples, the processing unit 1535 is a multicore processor or a plurality of multicore processors. Also, the processing unit 1535 may be fixed or it may be reconfigurable. The processing unit 1535 may control the components of any of the user device 1510, application server 1520, and database system 1530. The storage devices 1540 may not be limited to a particular storage device and may include any known memory device such as RAM, ROM, hard disk, and the like, and may or may not be included within a database system, a cloud environment, a web server or the like. The storage 1540 may store software modules or other instructions/executable code which can be executed by the processing unit 1535 to perform the method shown in FIG. 4. According to various embodiments, the storage device 1540 may include a data store having a plurality of tables, records, partitions and sub-partitions. The storage device 1540 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a memory storing processor-executable program code of a test automation module; and
a processing unit to execute the processor-executable program code to cause the system to:
receive a scenario including a plurality of steps;
assign each step to one of: a baseline phase, a bridge phase and a post-upgrade phase, wherein:
the bridge phase includes a transition of the system from a first runtime system to a second runtime system,
each of the first runtime system and the second runtime system has a respective runtime, and
the second runtime system is deployed parallel to an executing first runtime system;
execute an automate for the scenario, wherein execution of the automate includes a first pause of the automate at an end of the baseline phase and a second pause of the automate at an end of the bridge phase, and wherein the automate is executed for the steps assigned to the baseline phase with the first runtime system;
initiate, as part of the bridge phase, the transition of the system from the first runtime system to the second runtime system in response to the first pause of the automate at the end of the baseline phase;
resume execution of the automate for one or more steps assigned to the bridge phase during the transition;
initiate the second pause at the end of the bridge phase;
complete the transition to the second runtime system; and
resume execution of the automate for the one or more steps assigned to the post-upgrade phase.

2. The system of claim 1, wherein the post-upgrade phase is executed with the second runtime system.

3. The system of claim 1, wherein the assignment of each step further comprises processor-executable program code to cause the system to:
receive a first breakpoint indicative of the first pause; and
receive a second breakpoint indicative of the second pause.

4. The system of claim 3, further comprising processor-executable program code to cause the system to:
generate the automate in response to receipt of the first breakpoint and receipt of the second breakpoint.

5. The system of claim 1, further comprising processor-executable program code to cause the system to:
resume execution of the paused automate in response to selection of a resume control.

6. The system of claim 1, further comprising processor-executable program code to cause the system to:
update the assignment of one or more steps to one of: the baseline phase, the bridge phase and the post-upgrade phase.

7. The system of claim 1, further comprising processor-executable program code to cause the system to:
resume execution of the automate from a beginning of the phase in which the automate failed.

8. The system of claim 1, further comprising processor-executable program code to cause the system to:
execute a functional data check in the post-upgrade phase.

9. The system of claim 8, wherein the functional data check is executed with data from the baseline phase and the bridge phase.

10. The system of claim 1, further comprising processor-executable program code to cause the system to:
execute a smoke test in the baseline phase.

11. The system of claim 1, further comprising processor-executable program code to cause the system to:
execute at least one of a regression test and a data consistency check in the bridge phase.

12. A method comprising:
receiving a scenario including a plurality of steps;
assigning each step to one of: a baseline phase, a bridge phase and a post-upgrade phase, wherein;
the bridge phase includes a transition of a system from a first runtime system to a second runtime system and the bridge phase is executed on the first runtime system,
each of the first runtime system and the second runtime system has a respective runtime,
the second runtime system is deployed parallel to an executing first runtime system;
executing an automate for the scenario, wherein execution of the automate includes a first pause of the automate at an end of the baseline phase and a second pause of the automate at an end of the bridge phase, and wherein the automate is executed for the steps assigned to the baseline phase with the first runtime system;
initiating, as part of the bridge phase, the transition of the system from the first runtime system to the second runtime system in response to the first pause of the automate at the end of the baseline phase;
resuming execution of the automate for one or more steps assigned to the bridge phase during the transition;
initiating the second pause at the end of the bridge phase;
completing the transition to the second runtime system; and
resuming execution of the automate for the one or more steps assigned to the post-upgrade phase.

13. The method of claim 12, wherein the post-upgrade phase is executed on the second runtime system.

14. The method of claim 12, wherein the assignment of each step further comprises:
receiving a first breakpoint indicative of the first pause; and
receiving a second breakpoint indicative of the second pause.

15. The method of claim 14, further comprising:
generating the automate in response to receipt of the first breakpoint and receipt of the second breakpoint.

16. The method of claim 12, further comprising:
resuming execution of the automate from a beginning of the phase in which the automate failed.

17. The method of claim 12, further comprising:
executing a functional data check in the post-upgrade phase, wherein the functional data check is executed with data from the baseline phase and the bridge phase.

18. A non-transitory, computer readable medium having executable instructions stored therein to perform a method, the method comprising:
- receiving a scenario including a plurality of steps;
- assigning each step to one of: a baseline phase, a bridge phase and a post-upgrade phase, wherein;
  - the bridge phase includes a transition of a system from a first runtime system to a second runtime system and the bridge phase is executed on the first runtime system,
  - each of the first runtime system and the second runtime system has a respective runtime, and
  - the second runtime system is deployed parallel to an executing first runtime system;
- executing an automate for the scenario, wherein execution of the automate includes a first pause of the automate at an end of the baseline phase and a second pause of the automate at an end of the bridge phase, and wherein the automate is executed for the steps assigned to the baseline phase with the first runtime system;
- initiating, as part of the bridge phase, the transition of the system from the first runtime system to the second runtime system in response to the first pause of the automate at the end of the baseline phase;
- resuming execution of the automate for one or more steps assigned to the bridge phase during the transition;
- initiating the second pause at the end of the bridge phase;
- completing the transition to the second runtime system; and
- resuming execution of the automate for the one or more steps assigned to the post-upgrade phase.

19. The medium of claim 18, wherein the post-upgrade phase is executed on the second runtime system.

* * * * *